US011964209B2

(12) United States Patent
Salazar et al.

(10) Patent No.: US 11,964,209 B2
(45) Date of Patent: Apr. 23, 2024

(54) MACHINE LEARNING BASED GAMING PLATFORM MESSAGING RISK MANAGEMENT USING GAMER BEHAVIOR

(71) Applicant: Sony Interactive Entertainment Inc., Tokyo (JP)

(72) Inventors: Arthur Salazar, San Mateo, CA (US); Xiaohan Zhang, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/697,500

(22) Filed: Mar. 17, 2022

(65) Prior Publication Data

US 2023/0294002 A1 Sep. 21, 2023

(51) Int. Cl.
  *A63F 13/00* (2014.01)
  *A63F 13/79* (2014.01)
  *H04L 67/131* (2022.01)

(52) U.S. Cl.
  CPC ............ *A63F 13/79* (2014.09); *H04L 67/131* (2022.05)

(58) Field of Classification Search
  CPC .......... A63F 13/67; A63F 13/79; A63F 13/75; A63F 13/57; A63F 13/80
  See application file for complete search history.

(56) References Cited

U.S. PATENT DOCUMENTS

| 11,272,023 | B1 | 3/2022 | Everitt | |
| 2013/0123003 | A1* | 5/2013 | Williams | G07F 17/32 463/29 |
| 2016/0253598 | A1* | 9/2016 | Yamada | G06N 20/20 706/12 |
| 2017/0083829 | A1 | 3/2017 | Kang et al. | |
| 2019/0052471 | A1* | 2/2019 | Panattoni | H04L 67/306 |
| 2020/0142999 | A1 | 5/2020 | Pedersen | |
| 2021/0217024 | A1* | 7/2021 | Chiarello | G06Q 20/4015 |
| 2021/0402304 | A1 | 12/2021 | Dorn et al. | |
| 2022/0008830 | A1 | 1/2022 | Valencia | |
| 2022/0387887 | A1 | 12/2022 | Kipnis | |
| 2023/0294002 | A1 | 9/2023 | Salazar et al. | |

OTHER PUBLICATIONS

"MSR Datasets page", 2014.
Chen et al., "Systems and Methods for Domain Adaptation in Neural Networks", related U.S. Appl. No. 16/176,775, Non-Final Office Action dated Apr. 4, 2022.
Deng et al., "Sparse Autoencoder-based Feature Transfer Learning for Speech Emotion Recognition", 2013, Machine Intelligence & Signal Processing Group, MMK Technische Universtitat, Munich, Germany.

(Continued)

*Primary Examiner* — David L Lewis
*Assistant Examiner* — Eric M Thomas
(74) *Attorney, Agent, or Firm* — John L. Rogitz

(57) ABSTRACT

A machine learning (ML) model is used to identify spam messages and spammers in computer game settings based on learned gamer behavior. An evaluator module receives score(s) from the ML model indicating whether a particular message is spam or other undesired message and when the scores satisfy a threshold, passes the message to a punishment module to determine whether the warn, suspend, or ban the sending account.

20 Claims, 11 Drawing Sheets

(Continued)

(56) References Cited

OTHER PUBLICATIONS

Jamal et al., "Deep Domain Adaptation in Action Space", 2018, Centre for AI & Robotics, Bangalore, India.
Rozantsev et al., "Beyond Sharing Weights for Deep Domain Adaptation", IEEE Transactions on Pattern Analysis and Machine Intelligence, vol. 41, No. 4, Apr. 2019.
Xu et al., "A Unified Framework for Metric Transfer Learning", IEEE Transactions on Knowledge and Data Engineering, vol. 29, No. 6, Jun. 2017.
"International Search Report and Written Opinion", dated May 12, 2023, in the counterpart PCT application PCT/US23/62683.
Salazar et al., "Machine Learning Based Gaming Platform Messaging Risk Management", file history of related U.S. Appl. No. 17/696,365, filed Mar. 16, 2022.

\* cited by examiner

MACHINE LEARNING BASED GAMING PLATFORM MESSAGING RISK MANAGEMENT USING GAMER BEHAVIOR

FIELD

The present application relates generally to machine learning-based gaming platform messaging risk management.

BACKGROUND

Computer simulations such as computer games may permit messaging between players and/or spectators for added enjoyment.

SUMMARY

As understood herein, such messaging poses risks of inundating players with spam and/or messages from spambots, reducing enjoyment of gaming particularly online gaming. Users must report such messages and other humans must analyze them to determine appropriate action to take.

As also understood herein, computer gaming such as online gaming presents unique opportunities to detect spam and spammers (human or bot) that other computer-based activities do not present. In particular, significant details of player (gamer) behavior is typically recorded that other computer-based activities do not entail, and this game-specific behavior data can be used advantageously to reduce spam in computer games.

Accordingly, present principles use data, and specifically attributes that are across games and that are available only on gaming platforms. The unique in-game behavior patterns of players in the gaming platform also are used. Multiple machine learning systems automate the risk moderation process. A prediction system and decision engine are provided that are specific to the unique needs of a gaming platform. Every message sent during gameplay may be analyzed, not just messages that a user may report as potentially problematic.

In one aspect a system includes at least one computer medium that is not a transitory signal and that in turn includes instructions executable by at least one processor to receive from at least a first machine learning (ML) model at least one indication of whether a first message sent from a first account during play of a computer simulation is of a predetermined type. The instructions are executable to, responsive to the indication, signal at least one action module to determine an action and implement the action on the first account. The first ML model is configured to receive as input information pertaining to user behavior in the computer simulation.

The predetermined type may be one or more of spam, abuse, and profanity.

The indication pertaining to user behavior can include indication of gaming behavior, such as one or more of games played, playing time, game play history, number of trophies earned, in-game activity, and in-game activity success rate.

In addition, or alternatively, the indication pertaining to user behavior can include one or more of user messaging behavior, such as frequency of sending messages, number of different accounts messaged, region of accounts messaged, and message types.

In addition, or alternatively, the indication pertaining to user behavior can include one or more of number of games owned, number of non-free game purchases.

In another aspect, a method includes processing data associated with messaging and representing user behavior related to a computer simulation using a machine learning (ML) model, and using an output of the ML model, determining whether to apply corrective action to an account associated with the messaging.

In another aspect, a device includes at least one processor configured to send information pertaining to every message sent in a computer simulation by player accounts to a machine learning (ML) model. The information provided to the ML model represents user behavior within the computer simulation. The processor is configured to use outputs of the ML model to selectively apply corrective action to the player accounts.

The details of the present application, both as to its structure and operation, can be best understood in reference to the accompanying drawings, in which like reference numerals refer to like parts, and in which:

DETAILED DESCRIPTION

Figure 1:
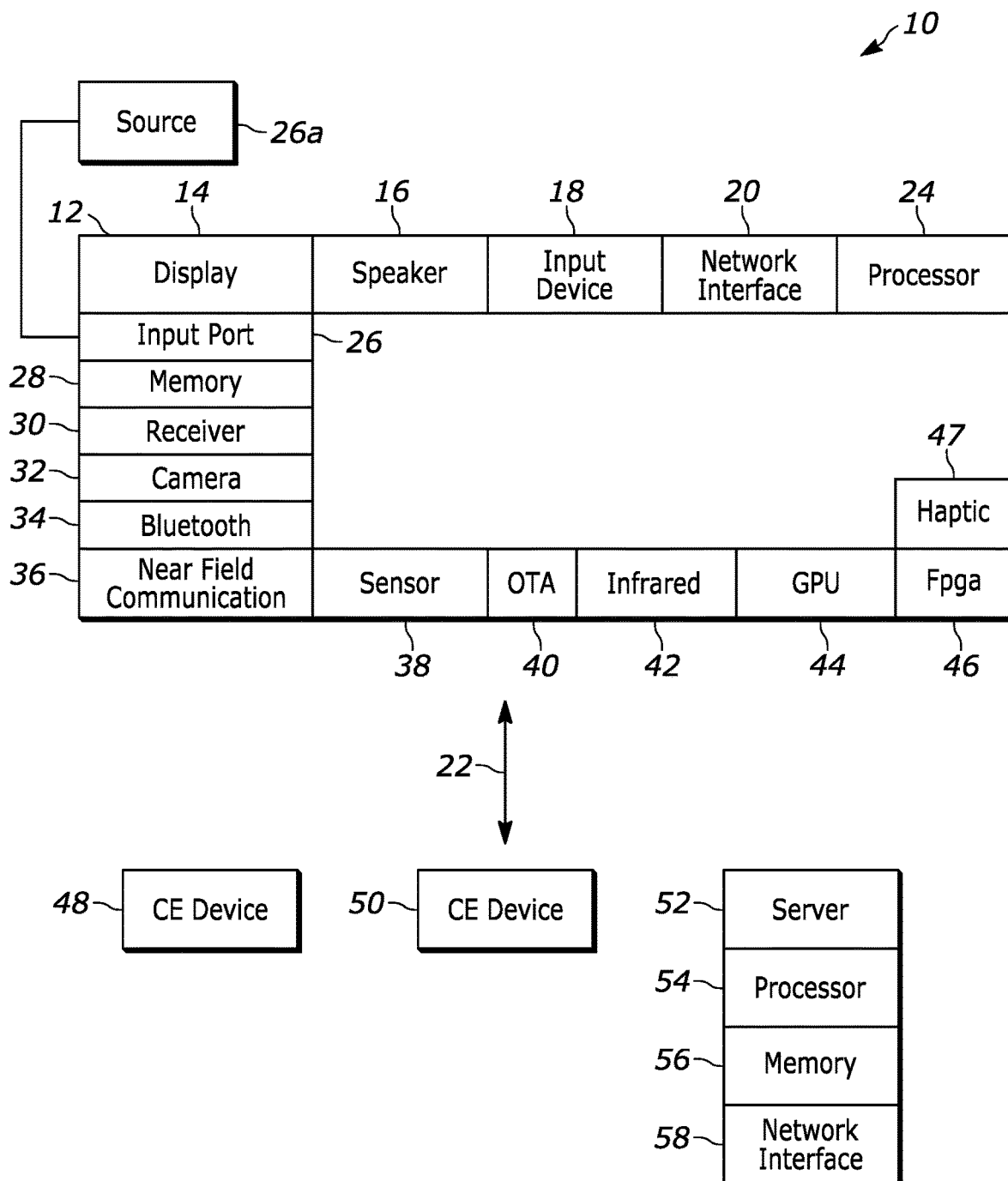
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. User interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
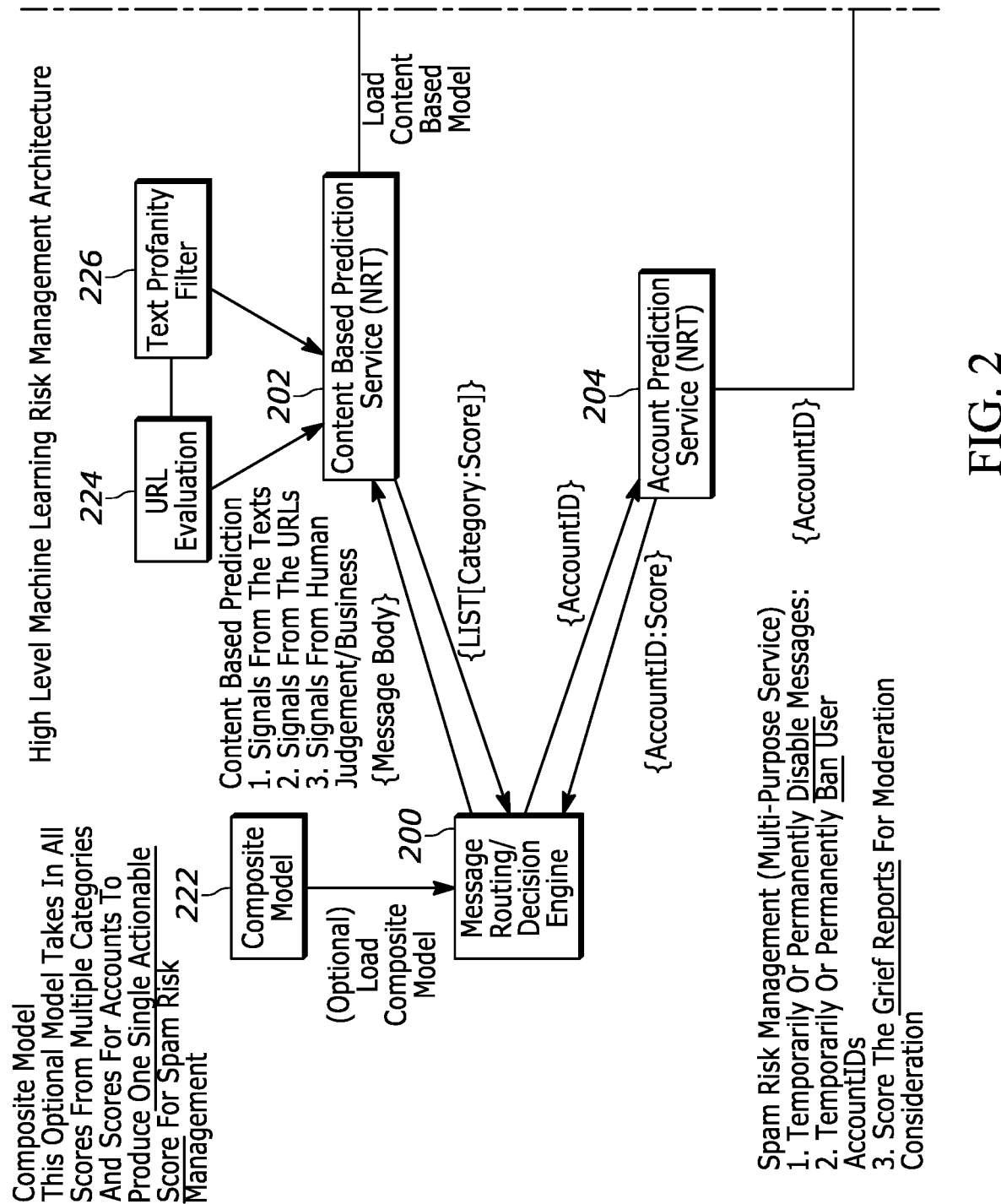
FIG. 2 illustrates an example machine learning (ML) risk management architecture at a high level.
Figure 2:
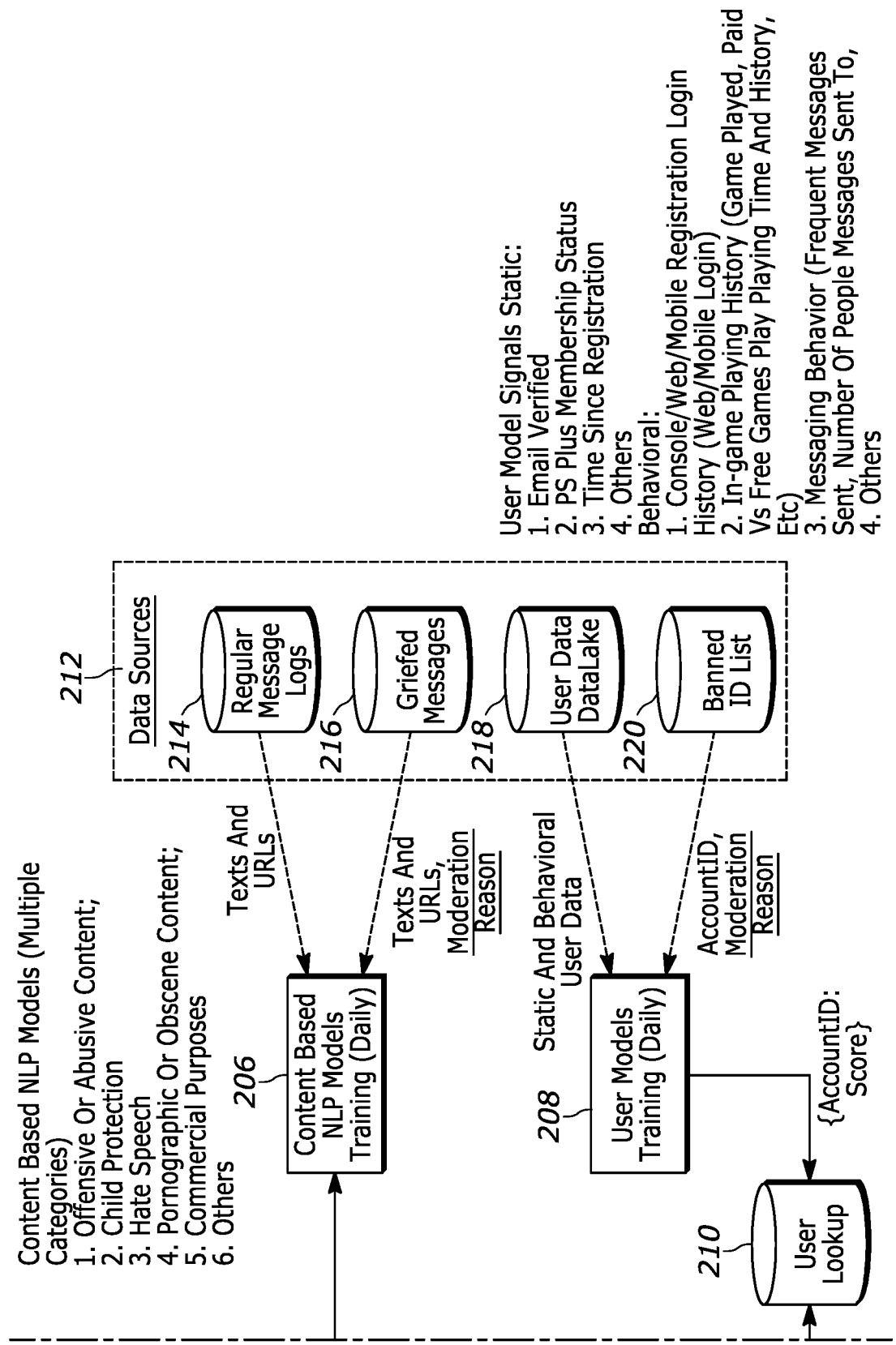

Turn now to FIG. 2. In overview, FIG. 2 illustrates two separate ML models that are used to exploit in-game data to determine whether a message is undesirable, e.g., is unwanted spam, or is from a human or bot spammer. Every message sent in in a computer simulation such as a computer game may be evaluated on-the-fly by the models in some example implementations and appropriate action taken responsive to model output. One model is the content-based model, which takes a look at the contents of the messages sent throughout the gaming platform including message texts, meta data, uniform resource locators (URL) or uniform resource indicators (URI), and characters. Another model is the "user model" which takes as input user behaviors.

A client-facing message routing and decision (MD) engine 200 communicates with a content-based prediction service 202 and an account-based prediction service 204. In turn, the content-based prediction service 202 loads a content-based natural language processing (NLP) machine learning (ML) model (or "content model" for short) 206, which can be updated daily, while the account-based prediction service 204 may communicate with a user behavior ML model (or "user model" for short) 208 through a user lookup database 210.

The content model 206 contains one or more machine learning models based on the contents of the messages shared between players. They can be applied to predict the likelihood of messages falling into multiple risk moderation categories, such as spam, offensive or abusive content, child protection, hate speech, pornographic or obscene content, etc.

In contrast, the user model 208 contains one or more machine learning models based on user behavior on the gaming platform, including gaming activities, purchasing habits, and messaging behaviors. They can be applied to predict the likelihood of target user acting against community guidelines, e.g., by spamming in the gaming platform.

The content-based ML model 206 may access various data sources 212 including regular message logs 214, covering all messages sent in a simulation system, as well as "griefed" message logs 216, which contains messages that have been flagged for review by moderators and/or reviewed by moderators.

As well, the user behavior ML model 208 may access the data sources 212 including accessing user behavior logs 218 and a list 220 of banned user identifications.

In some embodiments, the MD engine 200 may receive information from a ML-based or rule-based composite model 222 that tallies scores from other ML models described herein and outputs a single score on which action is taken consistent with present principles. Further, FIG. 2 shows that the content-based prediction service 202 may receive information from a uniform resource identifier (URI) evaluation module 224 and a text profanity filter 226.

The system shown in FIG. 2 can evaluate every message sent in a computer simulation system or computer game on the fly using data that doesn't exist anywhere else—i.e., game data. As detailed further below, this data includes user (also referred to herein as player or gamer) behaviors such as number of boss kills, game genre (since some games may naturally entail more vulgarity than others and hence vulgarity would be less actionable in such games), and other user behavior information specific to the simulation community and/or simulation platform itself, including how much time a particular user originating a message under test has played the simulation in which the message was sent, whether the user purchased the simulation, how frequently the user plays the particular simulation, etc., all of which may be used as described herein to determine whether a particular user is a human spammer or bot spammer. This base information may change from game to game because behavior in one game may not an anomaly in different game.

Discussing FIG. 2 in greater detail, both the user-based on content-based models may be trained with four type of data sources. These include the regular message logs 214 which stores and processes the regular messages and communications sent between the users, and the griefed message logs 216 which stores moderated messages and their moderation outcomes from our internally moderation team. The data sources shown in FIG. 2 also includes the user data 218 which stores a vast variety of user behavior data, including their purchase history, game play history, in-game activity history, messaging history, etc. The user data is unique to the gaming platform. For example, in game play history, which games a user has played, for how long, and in how many sessions may all be recorded in the user data 218. As another example, for in-game activity history, the user data can record how successful the users are for certain in-game activities; how frequently they killed the boss, finished the task; how many trophies they have obtained, their inferred skill level.

Messaging history is also unique to gaming platforms as users may employ special languages unique to their gaming communities, and special abbreviations unique to the games they played. The patterns learned through machine learning are unique to game platforms.

FIG. 2 also shows the banned ID list which stores historically banned account IDs.

Both models can be trained on these data sources (after data processing and feature extraction). The trained models are then loaded into the respective online real-time services 202, 204 to perform the predictions as to whether messages are spam and/or message originators are spammers. Once the consumer-facing MD engine 200, which may be implemented as an application programming interface (API) receives messages sent through an account ID, the message body and account ID are sent to the content-based prediction service 202 and the account prediction service 204. The two services return back machine learning prediction scores for the message body based on the content model, and the machine learning prediction scores for the account ID based on the user model.

In examples, the composite model 222 may be provided to combine the prediction scores from the content model 206 and from the user model 208 to predict one single actionable score for spam risk management. The score is used to perform appropriate moderation actions.

Figure 3:
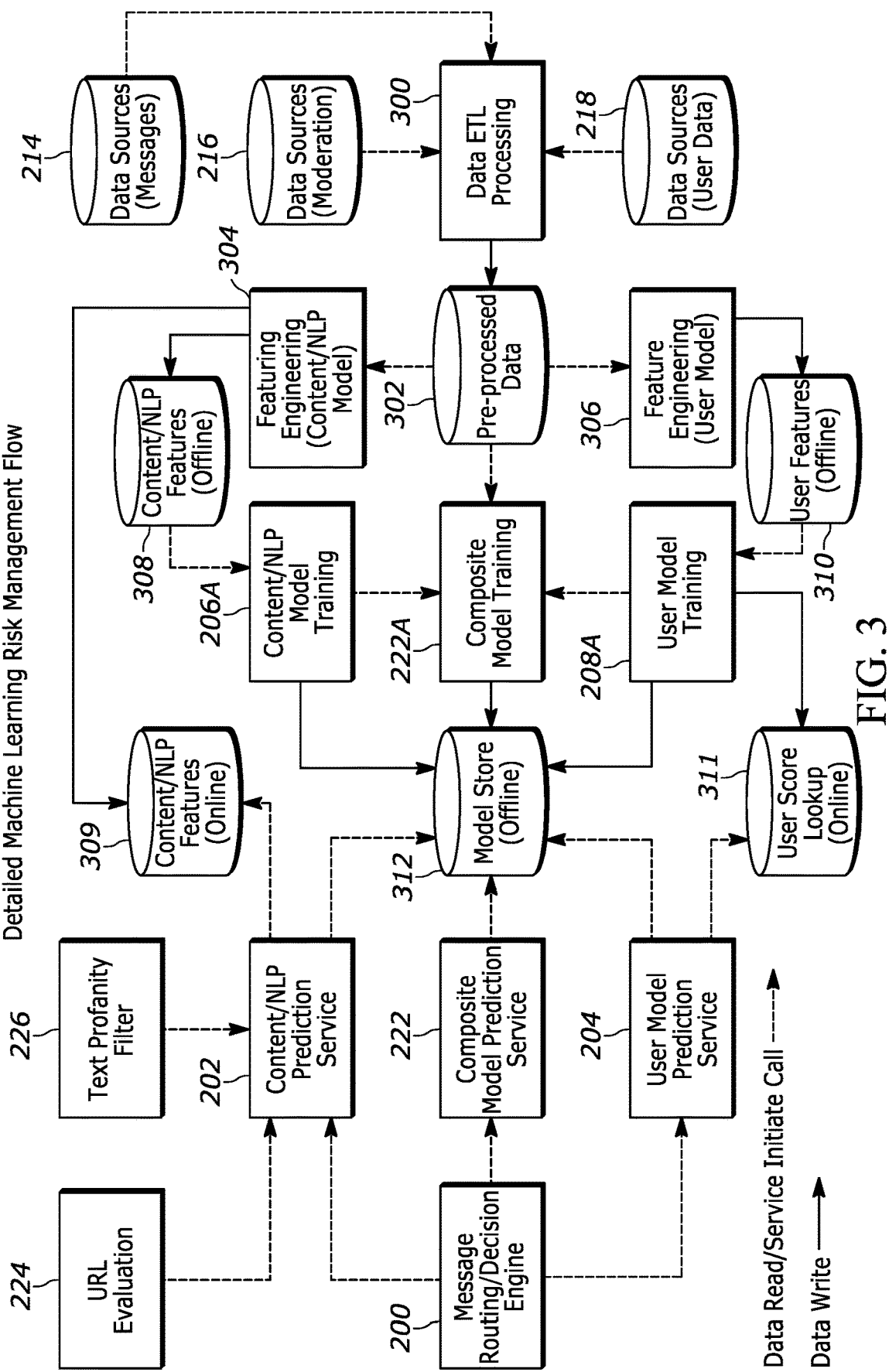
FIG. 3 illustrates an example ML risk management information flow.

Refer now to FIG. 3 for an understanding of the ML workflow employed consistent with present principles. A data extract, transform, and load (ETL) module 300 reads data from the regular message logs 214, "griefed" message logs 216, and user behavior logs 218 and writes a combination of these logs to a pre-processed database 302.

The data logs can contain unique, game platform-specific data to build machine learning models for each individual computer simulation if desired, so that each online computer game in a gaming system, for example, may use its own unique ML models to predict spam and spammer accounts. It is to be understood that any data listed below can be game-specific or, if desired, not be game-specific and instead may represent a composite score aggregated across all games associated with a user account.

Data that may be contained in the user data 218, for instance, can include, static user data such as wallet balance, age, gender, country, city, language, active account or not, email verification status, registration status, and membership status. User data also may include user gaming behavior, if desired grouped game by game, such as games played, playing time, play history, number of trophies earned by the account, in-game activity, and activity success rate. User data further may include game-specific information regarding user messaging behavior, frequency of sending messages, number of different accounts messaged, region of accounts messaged, and message types. User data may include user commercial behavior such as number and titles of games owned, number and titles of non-free game purchases.

Such data may be used to train a model on whether certain user behavior is risky and indicative of a problematic account requiring punishment, such as a spammer account. For example, if an account sends messages at a high frequency, this may indicate a spambot and thus indicate risk. If an account sends a number of group messages satisfying a threshold a spambot may be indicated. If an account has never purchased a computer game but has acquired a number of friends satisfying a threshold, a spambot may be indicated. If an account sends a group message to a number of recipients satisfying a threshold, spambot may be indicated.

Game-specific or composite (aggregated) user social data also may be stored in the user data 218. Such data may include links to social profile pictures and friendship status.

Messaging data contained in the regular and griefed message logs 214, 216 may be game-specific or composite and may include message bodies, and message type, length, and time started.

The pre-processed database 302 is read by a content feature extraction module 304 and user feature extraction module 306. The content feature extraction model outputs feature vectors representing the data read from the pre-processed database 302 to an offline content feature vector database 308 and an online content feature vector database 309. The user feature extraction model 306 outputs feature vectors representing data read from the pre-processed database 302 to an offline user feature database 310. The data is transformed into machine learning-friendly data formats and engineered into data vector representations that are digestible by the machine learning algorithms.

The feature vectors in the offline databases 308, 310 are respectively read in a training phase by an in-training content model 206A, in-training user model 208A and, when provided, an in-training composite model 222A, which also reads the pre-processed database 302 as shown. Also as shown, the in-training user model 208A may also write information to an online user score lookup database 311 in embodiments that, for user models, currently don't have the need to update the scores in real-time, in which case scores may be calculated for users and cached in the online user score lookup database 311. The real time user score service 204 reads scores from the online user score lookup database 311 using user ID as entering argument. It is to be understood that user features from the user feature extraction model 306 also may be sent directly to the online user score lookup database 311.

It will be appreciated that, thus far in FIG. 3, feature engineering and model training reads input data and extracts patterns from the data (e.g., how frequently did the user play games recently, how successful were the users in finishing tasks in game), stored in the respective offline databases 308, 310, and used to train the models 206, 208, 222 with these patterns, with the goal to predict how likely the target user and messages are risky, e.g., how likely they are spams, threatening other users, and not following our community guidelines. Note that the training data may contain ground truth such as messages annotated by human as spam, user behaviors annotated by a human as potential spammer account, etc.

The in-training models 206A, 208A, 222A may be written to an offline model store 312. At this step the three categories of models may be built from the respective in-training models 206A, 208A, 222A for their specific tasks: the content model 206 to evaluate message content as spam, the user model 208 to evaluate user behavior patterns as spammer accounts, and the composite model/service 222.

As indicated in FIG. 3, the respective content, user, and composite prediction services 202, 204, 222 read data from the model store 312 and online content feature database 309 and online user feature database 311. At this stage the online prediction services 202, 204, 222 are built to return prediction scores based on user (account ID) and messages (message body) input. All three services may load the models trained as described above, read the features, and extracted patterns, and make real-time predictions.

Figure 4:
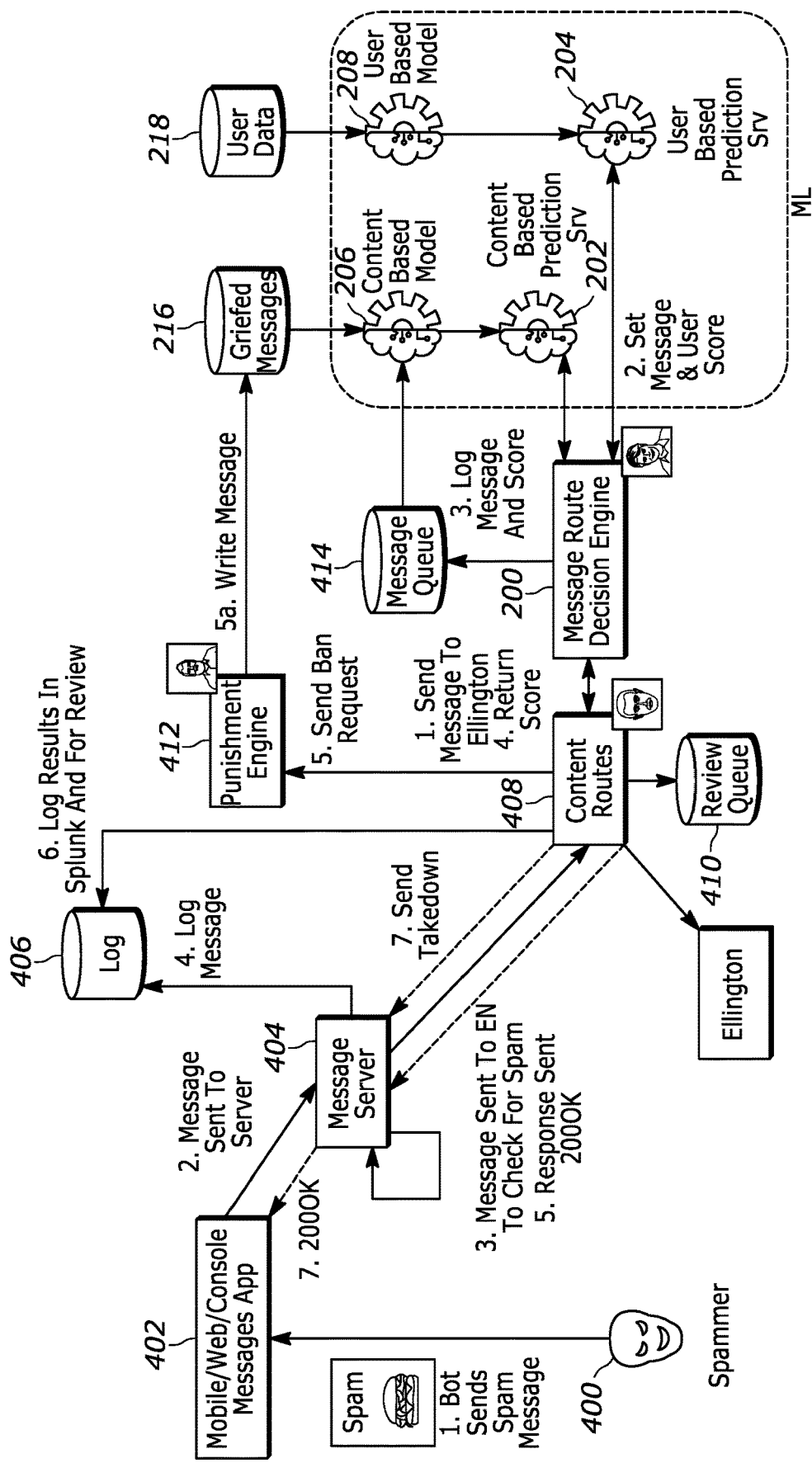
FIG. 4 illustrates further details of an example ML risk management information flow.
Figure 5:
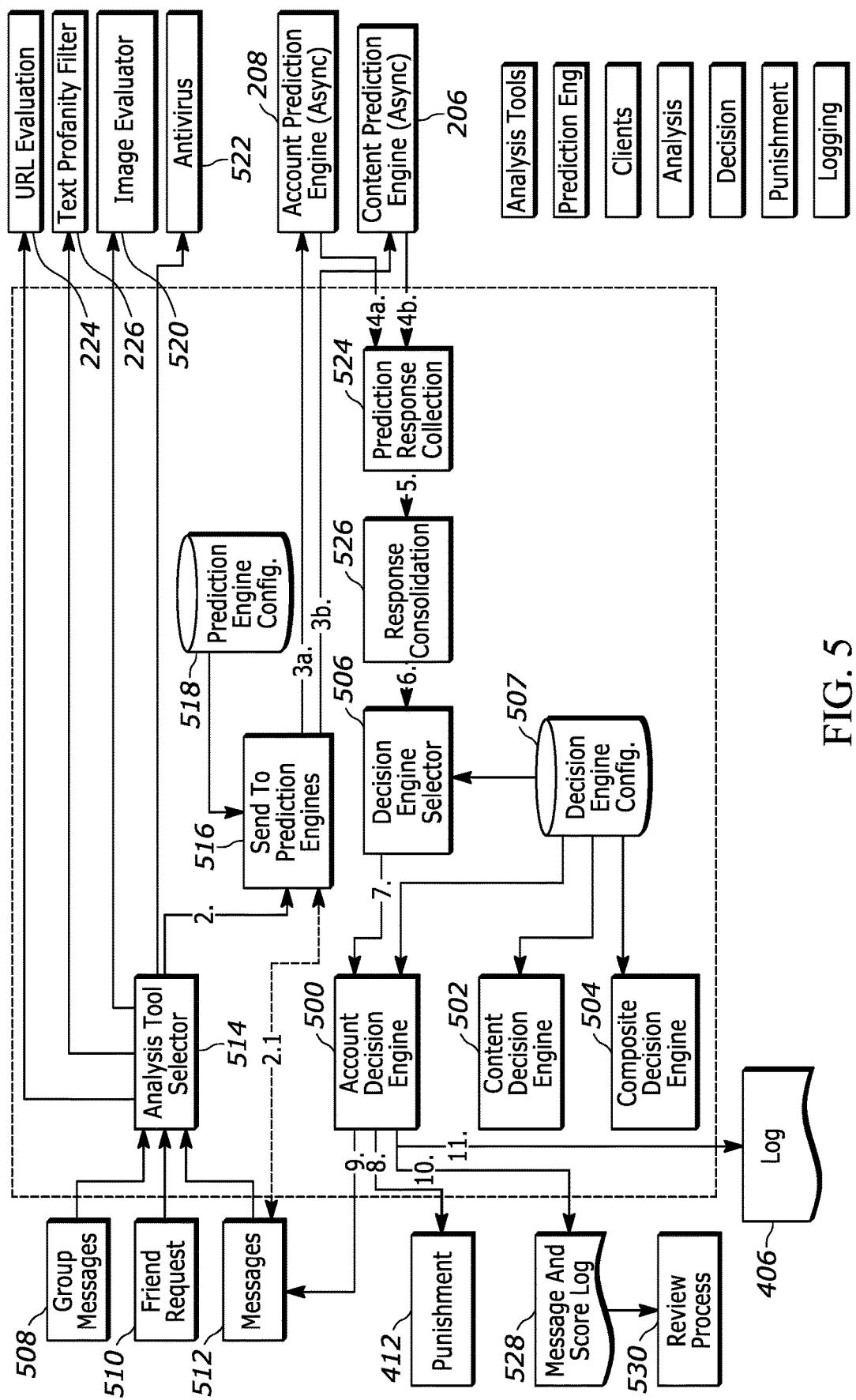
FIG. 5 illustrates further details of an example ML risk management information flow.

FIGS. 4 and 5 illustrate details of how the MD engine 200 shown in FIG. 2 uses ML to determine the probability of a particular message or user meeting "risk" criteria, such as whether a message is spam, or sexually explicit, or unduly profane, etc.

For instance, the ML models trained as described above may be trained on appropriate data (including data set forth herein) to evaluate a message and the possibility that it is a spam message. The ML models may be trained to evaluate a message and the sender to determine whether the user is a spambot. Once that is determined (on a score of 0.0 to 1.0 where the closer the score is to 1.0 is higher probability that it meets the criteria), then that score is passed to one or more decision engines to determine what, if any, the punishment should be based on the score and the inference engine.

In FIG. 4, assume a spammer account 400 sends a spam message to an in-game messaging app 402. The app 402 sends the message to a message server 404, which logs the message into a log 406 and to a content router 408 which may execute one or more ML models described herein to determine if the message is spam. The content router 408 may return a result to the message server 404 which in turn can relay the result back to the app 402. The content router 408 also may send the evaluation result to the log 406 and/or to a review queue 410 for human review and if desired annotation for input to further training of the ML model being executed.

The content router 408 can send a request to a punishment engine 412 to ban or otherwise punish the spammer account 400. The punishment engine 412 may write the message to the griefed message log 216, which can be read, along with user date from the user log 218, by the ML models 206, 208. Note that the MD engine 200 also may communicate with the punishment engine 412.

The content router 408 also can send the message to the MD engine 200, which can send the message to a message queue 414 that also may be read by the ML models 206, 208. The content and user predictions services 202, 204 (and when provided, the composite prediction engine 222) are accessed by the MD engine 200 to, based on the outputs of the prediction's services, return a score representing the likelihood that the message is spam and/or that the account 400 is a spammer account.

FIG. 5 illustrates an example in which the MD engine 200 and/or other component embodies plural decision engines, in the example shown, an account decision engine 500 to decide whether a score from the user ML model 208 indicates that a message sending account is risky, e.g., is a spammer, a content decision engine 502 to decide whether a score from the content ML model 206 indicates that a message content is risky, e.g., is spam, and a composite decision engine 504 to decide whether a single composite score representing the user and content scores indicates risk.

A decision engine can be automated and thus need no human interaction. A decision engine may be specific to take into consideration the specific inference engine which in turn is specific to gaming data and actions. A decision engine can be particular to gaming actions and based on years of moderation experience and may be expandable to allow additional inference engines to be added without being recoded. Further, a decision engine can be programmable such that the punishments and matrix are programmable (e.g., using yaml) and can be updated and changed without changing the engine.

The engines can also record all the actions (because what it records for each action is programmable in the yaml) and these are set aside for later evaluation by humans for review or in case of an appeal.

All decision engines are loaded on startup with scores and actions relevant to the scores. As scores arrive from the ML engines they are collected until they all arrive or there is a timeout. The scores are then consolidated into a list and sent to a decision engine selector 506 that first examines the list of scores and corresponding ML models to select the one to operate on. Then the decision engine selector 506 determines which decision engine 500, 502, 504 from a decision engine configuration database 507 to send the score to. Thus, each decision engine corresponds to one or more ML models.

As discussed further shortly, the selected decision engine then uses the score and starts a script to run based on the score. This can be doing nothing, issuing a warning, suspending an account temporarily, to permanent cancellation of the account.

In FIG. 5, group messages 508, friend requests 510, and recipient-specific messages 512 are sent from computer simulation user accounts (clients) to an analysis tool selector 514 of the content router 408. The selector 514 sends its input to a block 516 of the MD engine 200, which receives ML models from a database 518 and sends the input to the user and content prediction models 208, 206 as shown. The analysis tool selector 514 may also send its input to various other analysis tools as well, including the URI evaluator 224 to evaluate whether any URIs in a message are on a restricted list, the text profanity filter 226 to evaluate whether a message body contains profanity or other disfavored speech, an image evaluator 520 to determine whether any images sent from users contain objectionable material, and an anti-virus evaluator 522 to determine whether any messages contain a virus. Any messages triggering a violation output from the analysis tools may be removed and/or the account sending the message punished.

FIG. 5 shows that the ML models 208, 206 send their output numbers (e.g., between zero and one, with one indicating highest probability of a violation and zero indicating lowest) to a prediction response collection block 524 in the MD engine 200. The responses are consolidated in a consolidation block 526 of the MD engine 200 and the consolidated score communicated from the consolidation block 526 to the decision engine selector 506.

In FIG. 5, the selected decision engine block 500 (or 502 or 504) of the MD engine 200 can send its decision output to the punishment engine 412 to determine an appropriate punishment for the account sending a message flagged as risky by the decision engine. The decision engine block 500 further may send its decision to a message and score log for human review at 530, as well as sending it to the log 406 for recording.

It may readily be appreciated that actions and decisions can be configurable and can be based on the game play.

Figure 6:
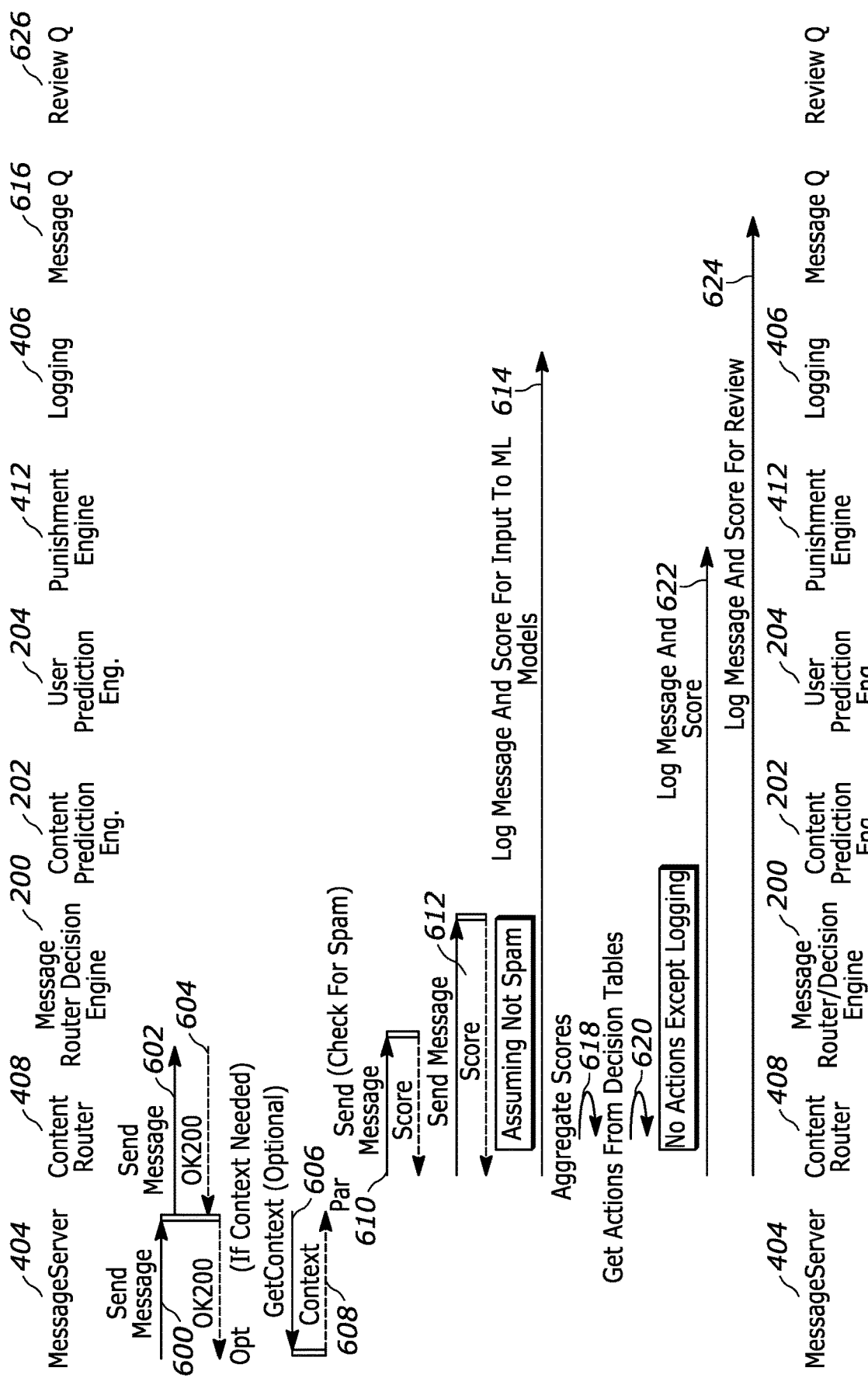
FIG. 6 illustrates an example sequence of messaging when risk level of a message is below a threshold.
Figure 7:
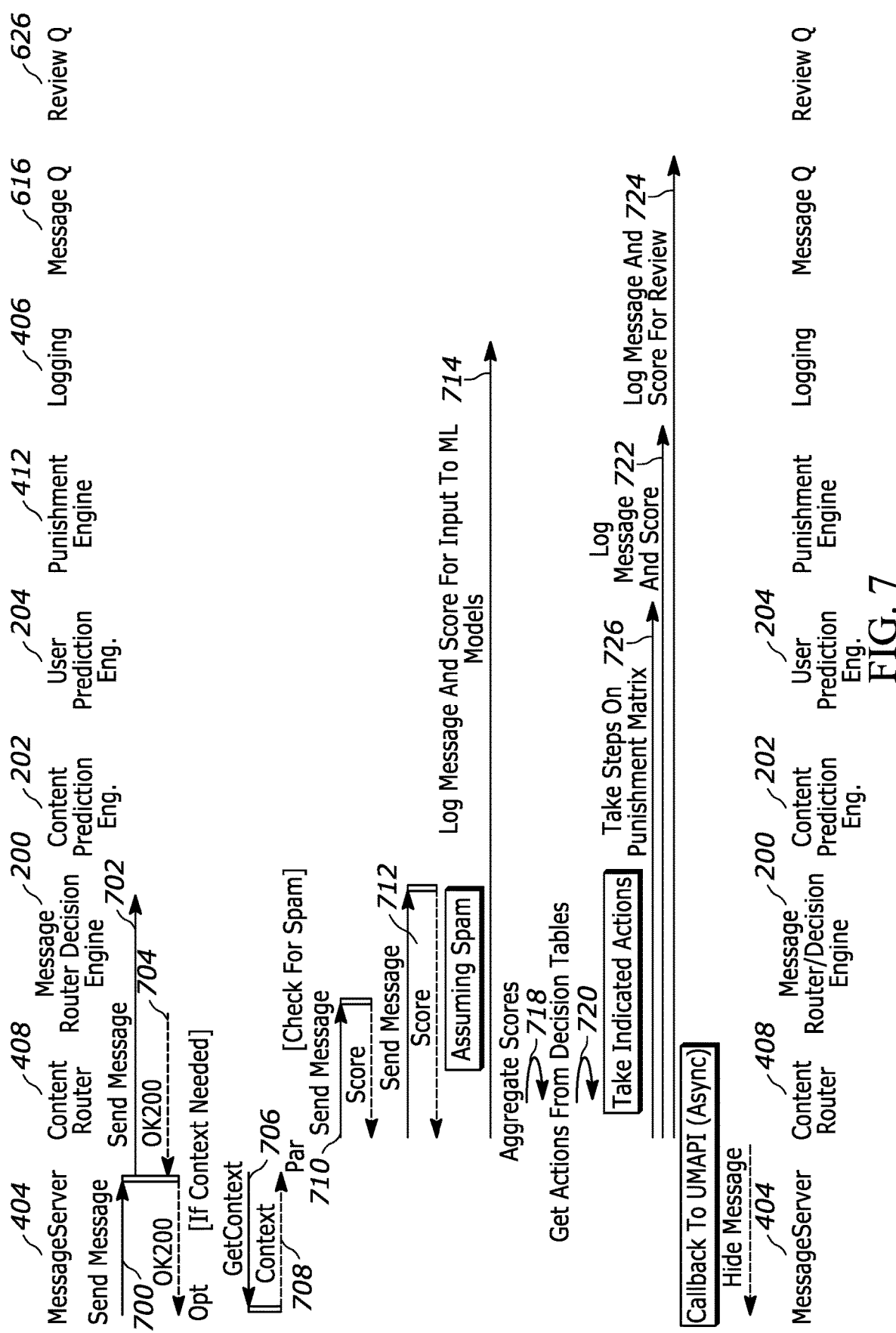
FIG. 7 illustrates an example sequence of messaging when risk level of a message is above the threshold.

FIGS. 6 and 7 illustrate message flows respectively assuming a message not requiring punishment and a message requiring punishment, in this case, when the ML models are trained to test for spam. It is to be understood that present principles may be employed to test for other types of risk, e.g., abusive, profane, etc.

At 600 in FIG. 6 a message is sent from the message server 404 to the content router 408 as described above. At 602 the message is forwarded from the content router 408 to the MD engine 200, which returns a message at 604 to the server 404 through the content router 408.

The MD engine 200 may read context at 606 from the server 404 if required and receive the context at 608.

Message loops 610 and 612 indicate that the MD engine 200 accesses the content model 202 and user model 204, respectively, to obtain their respective scores indicating whether the message content and user account, respectively, pose risks, in this, of spam.

FIG. 6 assumes the case of no risk (e.g., no spam). At 614 the MD engine 200 sends the message and scores to a message queue 616. At 618 the scores from the ML models may be aggregated and punishment actions obtained at 620 from decision tables or matrices as described above. Since FIG. 6 assumes no spam, no actions are taken except writing the message and its risk score to the log 406 at step 622, and if desired also writing out the message and score at 624 to a review process 626 for use in further training of the ML models.

At 700 in FIG. 7 a message is sent from the message server 404 to the content router 408 as described above. At 702 the message is forwarded from the content router 408 to the MD engine 200, which returns a message at 704 to the server 404 through the content router 408.

The MD engine 200 may read context at 706 from the server 404 if required and receive the context at 708.

Message loops 710 and 712 indicate that the MD engine 200 accesses the content model 202 and user model 204, respectively, to obtain their respective scores indicating whether the message content and user account, respectively, pose risks, in this, of spam.

FIG. 7 assumes the case of risk (e.g., spam). At 714 the MD engine 200 sends the message and scores to the message queue 616. At 718 the scores from the ML models may be aggregated and punishment actions obtained at 720 from decision tables or matrices as described above. Since FIG. 7 assumes spam, in addition to writing the message and its risk score to the log 406 at step 722, and if desired also writing out the message and score at 724 to the review process 626 for use in further training of the ML models, at 726 the MD engine 200 sends the score(s) indicating risk to the punishment engine 412. As discussed elsewhere herein, the punishment engine then, based on the score(s), decides what punishment to mete out, e.g., remove the message from view of gamers, warn the sending account, suspend the sending account temporarily, permanently ban the suspending account. The punishment is executed by any of the processes, components, and processors described herein.

With particular respect to the composite model 222 and its decision engine 504, it may accept inputs between zero and one from the user and content models and output a composite score based thereon. The composite model can be a classifier or an estimator and may employ a matrix of consolidated scores adjusted for costs that reflect human judgment as to the cost of mistake. The composite model outputs a number between zero and one indicating risk of a message, such as spam. Some types of risk such as child abuse may always be flagged as requiring punishment whereas other types of risk such as cursing may not be always flagged depending on game context, for instance. Thus, the matrix can apply weights to composite scores based on the associated risk of the underlying message, with riskier types of messages triggering a report to the punishment engine based on lower ML engine scores than less risky but still undesired message types.

An example matrix is given below:

| Parameter | Threshold (spam) | Threshold (abuse) | Threshold ... |
|---|---|---|---|
| User game behavior | .5 | .1 | .2 |
| Message content | .4 | .1 | .3 |
| Composite | .6 | .1 | .5 |

Thus, in the example shown, the threshold values are those that a model prediction score must satisfy (e.g., by meeting or exceeding) to trigger a corrective action message to the punishment engine. In the example shown, the first row of thresholds is used to determine whether a score from the user model 208 merits reporting to the punishment engine, the second row of thresholds is used to determine whether a score from the content model 206 merits reporting to the punishment engine, and the third row of thresholds is used to determine whether a score from the composite model 222 merits reporting to the punishment engine. The first column of thresholds pertains to a first message type, in this example, Spam, the second column pertains to a second message type, in this case, abuse, and succeeding columns of threshold pertain to respective succeeding message types, e.g., profanity, sexual content, etc. The thresholds may change as often as desired to reflect updated risk/penalty assessment decisions.

Thus, it will readily be appreciated that for any particular message, the threshold for the score from a ML engine for which the message will be reported can depend on both the type of message the message is grouped into, and the particular parameter associated with the message that is the subject of ML engine prediction.

Accordingly, a first message of a first message type and a first numerical score output by a first ML engine may be reported to the punishment engine, whereas the same first message of the first message type and the same first numerical score but output by a second, different ML engine may not be reported to the punishment engine.

In the same vein, a first message of a first message type and a first numerical score output by a first ML engine may be reported to the punishment engine, whereas a second message of a second message type and the same first numerical score output by the first ML engine may not be reported to the punishment engine.

Turning to the punishment engine 412, it too may be updated as often as desired to reflect updated punishment assignments. In one example, the lowest level of punishment may be to send a warning message to an account associated with content of a message or user behavior or composite score that satisfied a reporting threshold in the matrix above only one time, with more severe punishments from warning to message take down to temporary account suspension to permanent account banning being implemented for successive numbers of reports. A warning, for example, may be sent to an offending account after a single violation, a message may be taken down after N violations, with N being an integer greater than one, and a temporary suspension of an account may be implemented after M violations, with M being an integer greater than N.

In another heuristic, a warning, for example, may be sent to an offending account after a prediction score equals a threshold, a message may be taken down responsive to the prediction score exceeding a threshold by a first amount, and a temporary suspension of an account may be implemented responsive to the prediction score exceeding a threshold by a second amount greater than the first amount. Combinations of these heuristics may be implemented. The type of offending message also may result in varying punishments.

Thus, a first message exceeding a first threshold by a first amount may receive a first type of punishment, whereas a second message exceeding the first threshold by the first amount may receive a second type of punishment. A first message satisfying a first threshold a first number of times may receive a first type of punishment, whereas a second message satisfying a second threshold the first number of times may receive a second type of punishment. A first message satisfying a first threshold a first number of times may receive a first type of punishment, whereas a second message satisfying the first threshold a second number of times may receive a second type of punishment.

Figure 8:
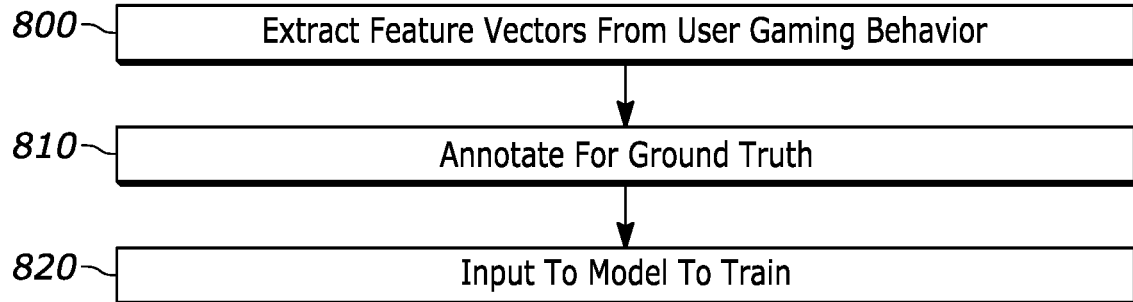
FIG. 8 illustrates example logic for training a ML model using gaming behavior, in example flow chart format.
Figure 9:
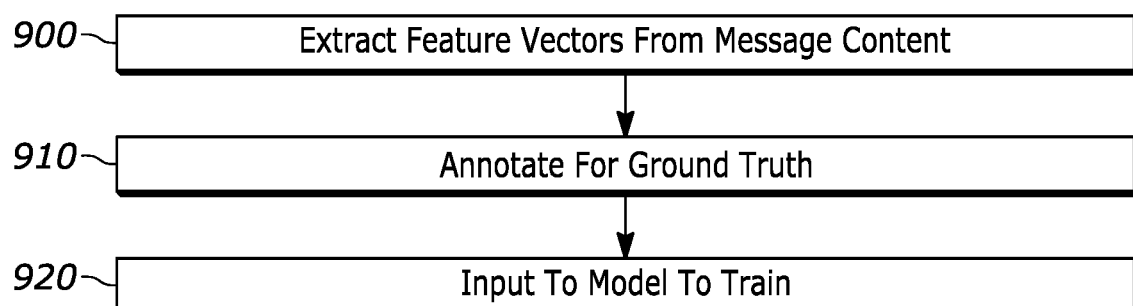
FIG. 9 illustrates example logic for training a ML model using message content, in example flow chart format.
Figure 10:
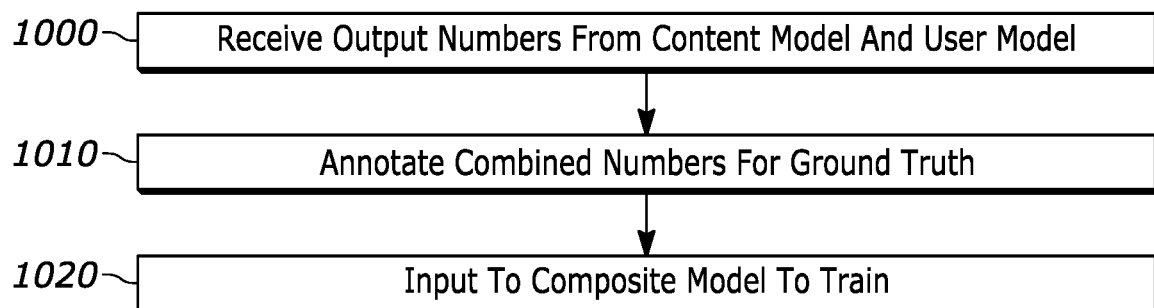
FIG. 10 illustrates example logic for training a composite ML model, in example flow chart format.

FIGS. 8-10 pertain to training various ML models described herein. Commencing at block 800 in FIG. 8, feature vectors are extracted from data representing user gaming behavior. The feature vectors may be annotated with classifications to produce a ground truth set of vectors at block 810. At block 820 the ground truth feature vectors are input to the user model 208 to train the model.

Commencing at block 900 in FIG. 9, feature vectors are extracted from data representing message content. The feature vectors may be annotated with classifications to produce a ground truth set of vectors at block 910. At block 920 the ground truth feature vectors are input to the content model 206 to train the model.

Commencing at block 1000 in FIG. 10, output numerical scores from the content model and user model are received. The output scores may be annotated with classifications to produce a ground truth set at block 1010 in which pairs of received scores are annotated to a single overall composite score. At block 1020 the ground truth scores are input to the composite model 222 to train the model.

Figure 11:
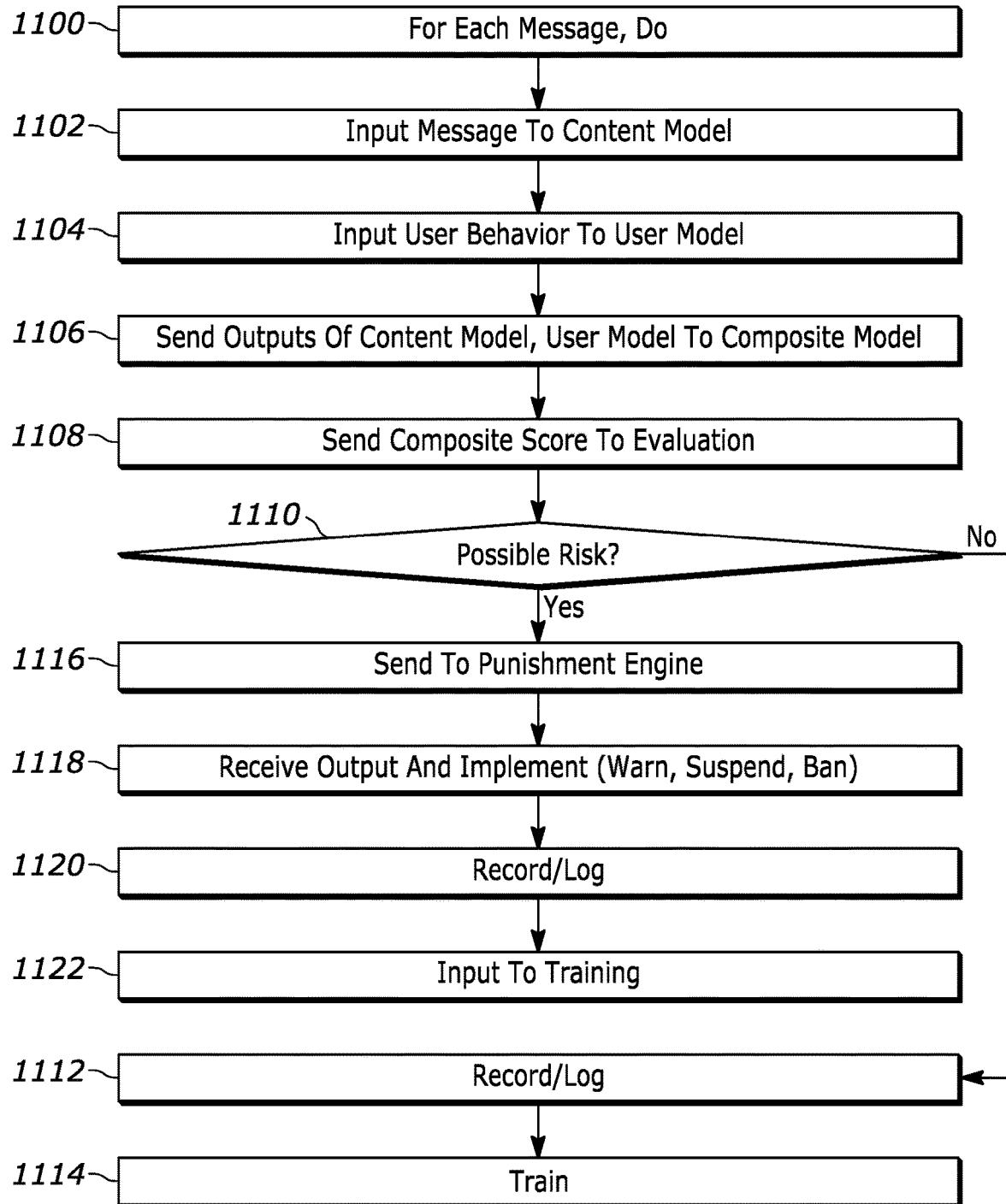
FIG. 11 illustrates example logic for using one or more ML models for message risk management consistent with present principles, in example flow chart format.

FIG. 11 illustrates principles set forth previously in flow chart format for illustration principles. The logic represented by FIG. 11 may be executed by any one or more of the processors described herein employing machine learning techniques and components.

Commencing at block 1100, for at least some and preferably for each message sent in a computer simulation or system of computer simulations, the message may be input at block 1102 to the content model 206. At block 1104 the message also is input to the user model 208. If desired, the outputs of the content model 206 and user model 208 may be sent at block 1106 to the composite model 222 for rendering a single score representing both content and user behaviors associated with the message under test.

Moving to block 1108, the score(s) are evaluated for whether the message and/or user behavior associated with the originating account of the message indicates risk. If a single composite score is used, the composite score may be the only score used at block 1108.

Moving to decision diamond 1110, it is determined whether the score(s) associated with the message indicate risk, i.e., whether the message is of a first type requiring no corrective action or of a second type (risky) requiring corrective action. If no corrective action is required, the message and/or user behavior associated therewith is recorded/logged at block 1112 and then input as training to the relevant models at block 1114.

On the other hand, if corrective action is required, at block 1116 a request is sent to the punishment engine 412 for corrective action along with the message, the score(s), and other relevant data. The output of the punishment engine is received at block 1118 and implemented. The message and/or user behavior associated therewith is recorded/logged at block 1120 and then input as training to the relevant models at block 1122.

Figure 12:
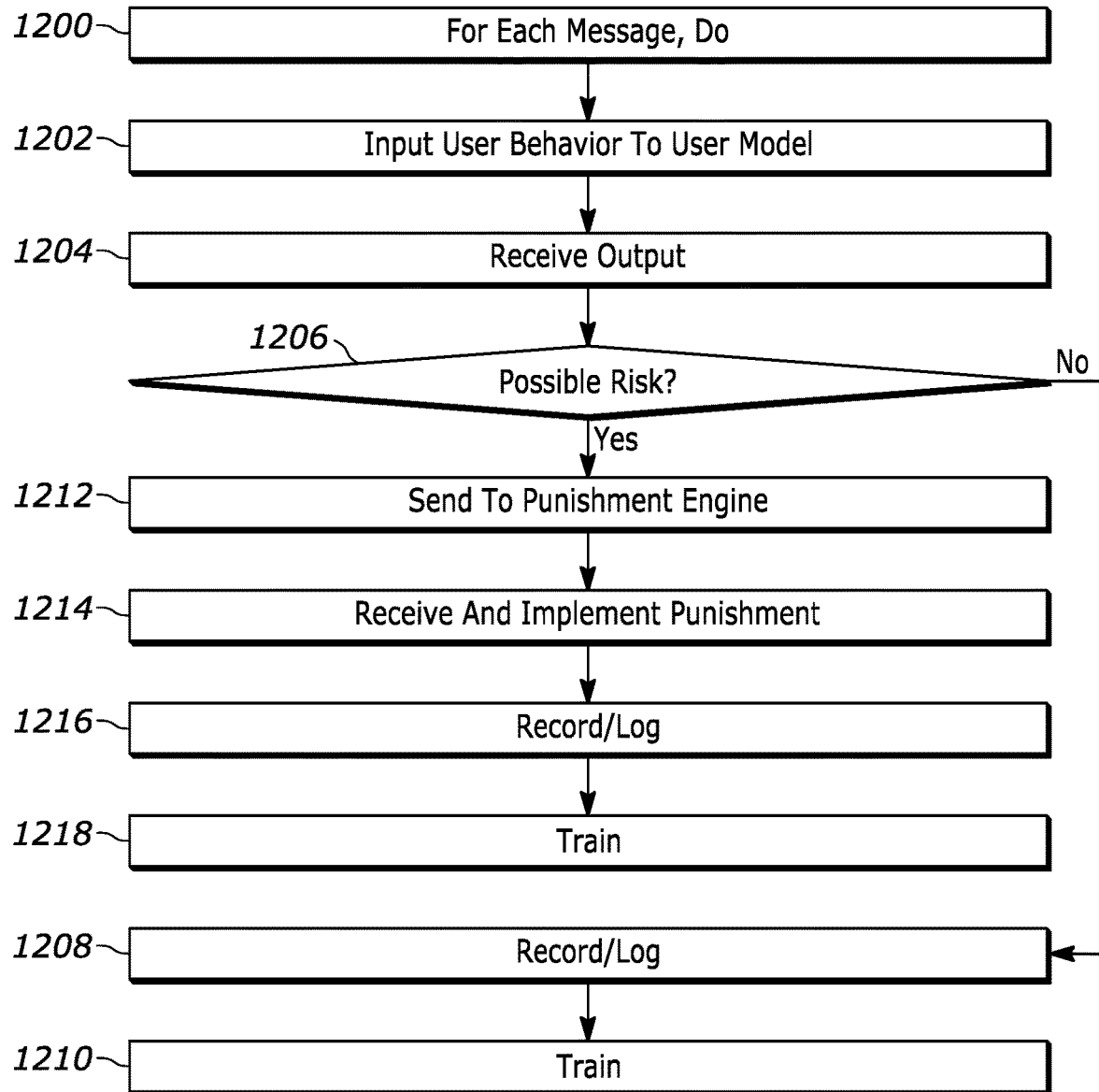
FIG. 12 illustrates alternate example logic for using one or more ML models for message risk management consistent with present principles, in example flow chart format.

FIG. 12 illustrates a simplified embodiment in which only user behavior unique to the particular computer simulation being monitored is used.

Commencing at block 1200, for at least some and preferably for each message sent in a computer simulation or system of computer simulations, the message may be input at block 1202 to the user model 208. The output score from the user model 208 is received at block 1204.

Moving to decision diamond 1206, it is determined whether the score(s) associated with the message indicate risk, i.e., whether the message is of a first type requiring no corrective action or of a second type (risky) requiring corrective action. If no corrective action is required, the message and/or user behavior associated therewith is recorded/logged at block 1208 and then input as training to the relevant models at block 1210.

On the other hand, if corrective action is required, at block 1212 a request is sent to the punishment engine 412 for corrective action along with the message, the score(s), and other relevant data. The output of the punishment engine is received at block 1214 and implemented. The message and/or user behavior associated therewith is recorded/logged at block 1216 and then input as training to the relevant models at block 1218.

While the particular embodiments are herein shown and described in detail, it is to be understood that the subject matter which is encompassed by the present invention is limited only by the claims.

What is claimed is:

1. A system comprising: at least one computer medium that is not a transitory signal and that comprises instructions executable by at least one processor to: input to at least a first machine learning (ML) model both text of a first message from a first account and an indication of user behavior during computer game play associated with the first account; the first ML model processing the message text of the first message and indication of user behavior during computer game play to render at least one indication of whether the first message sent from a first account during play of a computer simulation is of a predetermined type; responsive to the indication, signal at least one action module to determine an action; and implement the action on the first account, wherein the first ML model is configured to receive as input information pertaining to user behavior in the computer simulation, wherein the indication pertaining to user behavior comprises indication of gaming behavior, the gaming behavior being at least one of: number of games played, playing time, game play history, number of trophies earned, in-game activity success rate.

2. The system of claim 1, wherein the instructions are executable to indicate whether the first message comprises abuse.

3. The system of claim 1, wherein the instructions are executable to indicate whether the first message comprises profanity.

4. The system of claim 1, wherein the predetermined type comprises spam.

5. The system of claim 1, wherein the gaming behavior comprises games played.

6. The system of claim 1, wherein the gaming behavior comprises playing time.

7. The system of claim 1, wherein the gaming behavior comprises game play history.

8. The system of claim 1, wherein the gaming behavior comprises number of trophies earned.

9. The system of claim 1, wherein the gaming behavior comprises in-game activity.

10. The system of claim 1, wherein the gaming behavior comprises in-game activity success rate.

11. The system of claim 1, wherein the indication pertaining to user behavior comprises user messaging behavior.

12. The system of claim 1, wherein the indication pertaining to user behavior comprises frequency of sending messages.

13. The system of claim 1, wherein the indication pertaining to user behavior comprises number of different accounts messaged.

14. The system of claim 1, wherein the indication pertaining to user behavior comprises region of accounts messaged.

15. The system of claim 1, wherein the indication pertaining to user behavior comprises message types.

16. The system of claim 1, wherein the indication pertaining to user behavior comprises number of games owned.

17. The system of claim 1, wherein the indication pertaining to user behavior comprises number of non-free game purchases.

18. A method comprising:
processing data associated with messaging and representing user behavior related to a computer simulation using a machine learning (ML) model; and
using an output of the ML model, determining whether to apply corrective action to an account associated with the messaging, wherein the user behavior comprises at least one of: frequency of sending messages, number of different accounts messaged, region of accounts messaged, number of games owned, number of non-free game purchases.

19. A device comprising:
at least one processor configured to:
send information pertaining to messages sent in a computer simulation by player accounts to a machine learning (ML) model, the information representing user behavior within the computer simulation; and
use outputs of the ML model to selectively apply corrective action to the player account, wherein the user behavior comprises at least one of: frequency of sending messages, number of different accounts messaged, region of accounts messaged, number of games owned, number of non-free game purchases.

20. The system of claim 1, wherein the gaming behavior comprises game play history.

* * * * *